…

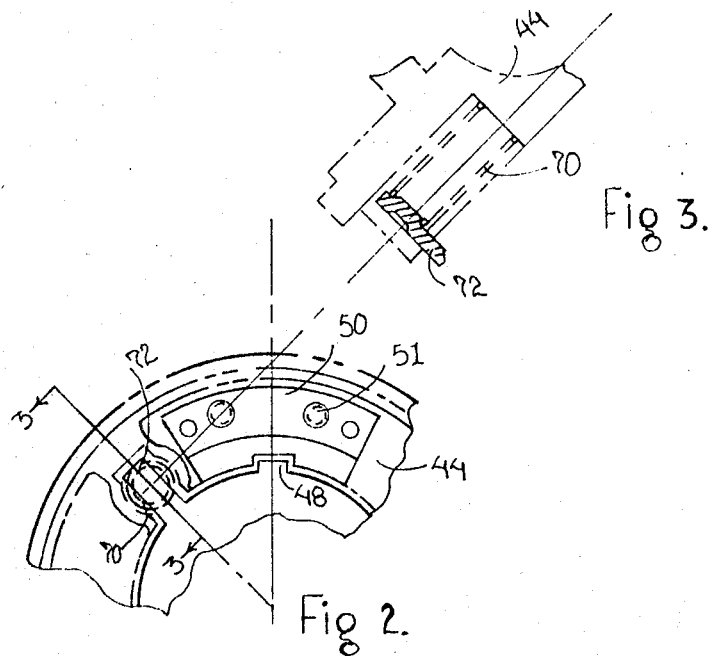
Fig 3.
Fig 2.
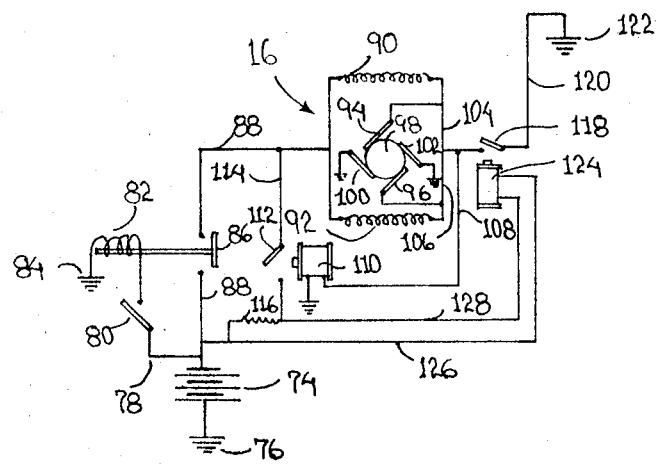
Fig 4.
James E. Buxton
Charles R. Emmick
H.R. Mortensen
INVENTOR.
BY
W.S. Thompson

United States Patent Office

3,465,353
Patented Sept. 2, 1969

3,465,353
STARTER DRIVE WITH SELECTIVELY-RELEASABLE FRICTION ADVANCE MECHANISM
James E. Buxton, Horseheads, Charles R. Emmick, Elmira, and Harold R. Mortensen, Horseheads, N.Y., assignors to The Bendix Corporation, a corporation of Delaware
Filed Nov. 2, 1967, Ser. No. 680,258
Int. Cl. F02n 11/00, 17/00
U.S. Cl. 74—7    6 Claims

ABSTRACT OF THE DISCLOSURE

A starter drive mounted on a motor driven helical screw shaft and having a resilient or spring-loaded friction connection with the housing structure which provides a force component axially translating the drive on the screw shaft into a cranking position whereby it engages an engine flywheel. The starter drive contains a unidirectional overrunning clutch and a pinion for engaging the flywheel. An abutment stop member is provided which the pinion strikes, producing a reactive thrust on the starter drive during cranking. The improvement consists of means utilizing the reactive thrust on the starter drive during cranking to release the resilient spring-applied friction connection and reduce frictional load on the starting motor during cranking.

---

It is known to apply a frictional force to a starter drive mounted on a helical screw shaft to develop an axial force component on rotation of the starter motor to shift or translate the starter drive into engagement with an engine flywheel for cranking. Such an arrangement is described in U.S. Patent 3,299,719—Toulier. It is desired, in order to obtain positive and reliable engagement and render the drive resistant to disengagement for all conditions short of de-energizing the starting motor, to utilize an ample friction force. It has been determined that an adequate friction force for shifting and to prevent inadvertent disengagement may, however, consume as much as 10 per cent of the total power of the starting motor during engine cranking.

It is an objective of the present invention to provide a starter drive with a resilient loaded friction connection to develop an ample friction force for translating the starter drive into engagement and which resists premature disengagement.

The starter drive includes means for selectively releasing the friction connection during cranking to reduce unnecessary power consuming drag on the starter motor at the time that maximum power is required.

It is another object of the present invention to utilize a reactive thrust imposed on a starter drive in cranking position to release a frictional connection between starter drive and fixed structure.

Other objects and advantages will become apparent on consideration of the accompanying description and drawings wherein:

FIGURE 2 is a partial section taken along section line 2—2 of FIGURE 1 showing a friction plate mounting arrangement;

FIGURE 3 is a fragmentary section taken along section 3—3 of FIGURE 2 illustrating a spring mounting arrangement; and FIGURE 4 is an electrical schematic of a braking system which may be utilized with particularly great advantage with a starter drive of the type disclosed.

Figure 1:
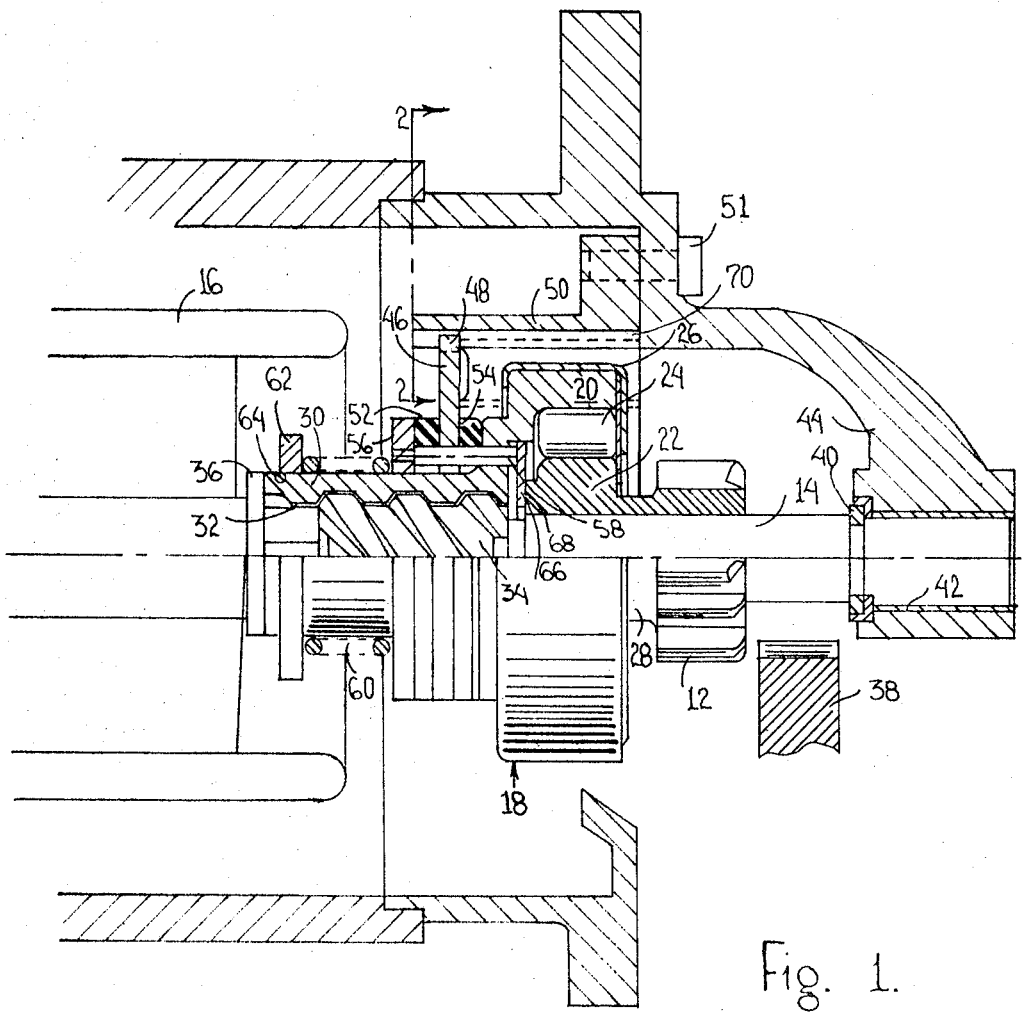
FIGURE 1 is a side view of a starter drive, partly in section, embodying the present invention.

Referring to FIGURES 1 through 3, our starter drive includes a pinion gear 12 slidably mounted on shaft 14 which is driven by starter motor 16. A unidirectional overrunning roller clutch of well-known construction is generally designated by numeral 18 and has an annular outer race 20 and annular inner race 22 and a plurality of drive rollers, one of which is illustrated at 24. The roller clutch is encased in a bent-over sheet metal member 26. Inner race 22 is integrally connected by web 28 with pinion 12.

Sleeve member 30 is integrally formed, connected with the outer race 20 of the roller clutch, and has formed on its inner diameter, helical screw threads or splines 32 which slidably and threadedly engage a mating helical screw shaft or spline 34 formed on the motor driven shaft 14.

Pinion 12, clutch 18 and sleeve 30 comprise the shiftable portion of the starter drive, illustrated in its disengaged or retracted position against a thrust washer 36, connected to shaft 14. The helical screw shaft connection 32, 34 permits this shiftable portion to both rotate with shaft 14 and advance to a limited extent axially on the shaft, whereby pinion 12 is brought into mesh with engine starting gear or flywheel 38 for cranking. The rightmost limit of travel of pinion 12, as viewed in FIGURE 1, is defined by abutment with thrust washer 40 set in a groove in shaft 14. Shaft 14 is supported on its extreme end remote from its driving motor by bushing 42 set in housing extension 44.

An axial force component for translating the shiftable portion of the starter drive from its disengaged to its engaged position with respect to engine gear 38 is developed by the interaction of a friction retarding connection and the helical shaft mounting. Particularly, there is provided an annular plate 46 concentric with the sleeve 30 and connected by straight splines 48 to fixed mounting bracket 50, secured by screws 51 to housing extension 44. As is known, the spline connection permits axial, but not rotative, movement of plate 46. A pair of rings of friction material 52 and 54 are disposed on opposed sides of plate 46, one of which may be bonded to clutch 18 and the other to the annular pressure plate 56, slidably mounted on the outer surface of sleeve 30 and rotative with said sleeve by means of a series of pins, one of which is illustrated at 58, extending through a connecting web between sleeve 30 and outer clutch race 20. Coil spring or resilient member 60 is concentrically mounted about sleeve 30 and bears on one end against pressure plate 56 and is confined on its other end by retainer 62, held by C ring connector 64. Resilient member 60 applies a force bringing, through pressure plate 56, friction members into contact with a predetermined force against non-rotative plate 46. The friction connection thus provided, with non-rotating structure, retards the rotation of the shiftable portion of the starter drive which induces a threading action of the screw shaft mounting, translating the shiftable portion axially towards its engaged position with engine gear 38.

An annular thrust ring 66 is disposed within the cavity of the roller clutch and bears on one side against a projection 68 extending from inner race 22, and on the other side against pins 58 connected to pressure plate 56. As pinion 12 strikes thrust washer 40 at the full end of its engaged cranking position, maximum starting torque is delivered from motor to engine through the starting gear, developing very high forces through the screw shaft connection, causing sleeve 30 and outer race 20 to continue to traverse axially even though inner race 22 and pinion 12 have hit a solid abutment. For this purpose, a space has been left in the clutch cavity which permits a limited degree of relative axial or telescoping movement between inner and outer clutch races and their connected structure. However, pressure plate 56 is prevented from following sleeve 30 and outer race 20 through this last increment of travel as pins 58 and washer 66 abut projection 68, thus releasing the resilient spring-loaded friction connection with plate 46. Thus, when full cranking torque is transmitted, the frictional drag is eliminated and does not become a factor in establishing the overall rating or size of the starting motor.

One or more springs 70, best shown in FIGURES 2 and 3, are confined between housing extension 44 and a radially-projecting tab 72 formed on the periphery of plate 46. Springs 70 provide a force on the combined shiftable portion of the starter drive, urging said portion in the disengaged direction in opposition to the translating force provided by the friction connection. In the most simple, but functionally less desirable arrangement, springs 70 may be relatively strong retraction springs for returning the shiftable portion of the starter drive. To perform this function reliably, they must be sufficiently strong to overcome any resistance to slide the pinion gear 12 through engine gear 38, yet must be inferior to the net translating force developed by the friction connection. While this balance may be struck, as suggested by Toulier in Patent 3,299,719, it is at the expense of both the desired positive nature of the friction connection hold in force and induces slower disengagement since the forces are offsetting.

Better hold-in and disengagement characteristics may be obtained by providing relatively minor or weak springs 70 which are merely called on to prevent the shiftable portion from drifting into the engine gear during running due to vibration or the like.

Very positive inertia retraction forces may be developed by providing separate brake means associated with the motor and shaft which, when used in combination with light anti-drift springs, provides a significantly-improved characteristic.

One known braking system is an electrical brake as illustrated in FIGURE 4 and has been described in connection with other starter drives in prior U.S. Patents 2,429,838—Buxton, and 2,353,900—Janes. Such a system involves only a minor modification to starting circuit including ignition switch and motor circuit by the addition of switching solenoids and a loading resistor.

Referring to FIGURE 4, there is schematically illustrated a battery 74, grounded at 76 and connected by lead 78 to ignition switch 80 which, when closed, permits current through coil 82, grounded at 84, thus closing power switch 86. Closure of power switch 86 connects battery 74 through lead 88 to field windings 90 and 92 of the starting motor 16. The other ends of fields 90 and 92 are connected to brushes 94 and 96 respectively, which conduct current through the armature 98 to the brushes 100 and 102 which are grounded to complete the starting circuit. To provide braking on opening of the ignition switch, the junctions of field coils 90 and 92 with brushes 94 and 96 are connected by leads 104, 106, and 108 to an electromagnet 110 which is arranged when actuated to close switch 112. Switch 112 controls a circuit which is in shunt with the power switch 86 and comprises a lead 114 and a resistor 116. The braking effect on the motor is secured by grounding the lead 108 which short-circuits the armature 98 of the starting motor while maintaining the energization of field coils 90 and 92. To this a switch 118 is connected to motor lead 108 and by lead 120 to the ground at 122. An electromagnet 124 is connected by leads 126 and 128 to the opposite ends of resistor 116 so that when voltage drop occurs through the resistor, that voltage is impressed on the electromagnet 124 to close switch 118.

In operation, closure of ignition switch 80 and, consequently, power switch 86 by the operator causes energization of the starter and rotation of shaft 14 permitting the starter drive to perform its engaging and cranking function. After the operator is satisfied that a permanent ignition has occurred, the ignition switch is released. At this instant, the starting motor is still rotating, generating a counter E.M.F. which is expressed between brushes 94 and 96 and ground. This voltage is impressed on the electromagnet 110, causing closure of switch 112. Until the opening of ignition switch, no voltage drop appears across resistor 116. On opening a power switch 86, however, a voltage drop appears across resistor 116, actuating electromagnet 124, thus closing switch 118 and short-circuiting the armature. This causes a powerful braking effect to be applied to the starting motor which develops strong inertia retraction forces between the screw shaft mating members which quickly and sharply disengages the shiftable portion of the starter drive.

If, during engine cranking, compression peaks or false firing of the engine induces a momentary overspeed of the engine gear 38 relative to the drive; i.e. the clutch overruns, the strong engagement forces due to transmitted torque are released. In many prior devices, this presented the possibility of premature disengagement. Should such a condition occur with the present device and the pinion 12 begin to retract from gear 38, it will only move a small increment whereupon the friction connection will be again applied, forcing re-engagement before demesh has occurred. This resistance to premature disengagement is particularly strong when springs 70 are only light anti-drift springs and separate disengagement means, such as the disclosed braking system or its equivalent, is utilized as part of the combined overall starting system.

Resilient spring member 60, in addition to providing a loading force on the friction connection, additionally applies a mesh enforcing yieldable force. If, for example, pinion 12 strikes a tooth of engine gear 38, spring 60 will compress, providing sufficient contact time between pinion and engine gear until the tooth abutment has cleared and then provides a snap-in-force urging the pinion 12 to enter the engine gear 38.

Other variations may be made without departing from the invention as defined in the appended claims.

We claim:
1. A starter drive comprising:
a motor driven shaft having first helical screw threads conected thereto;
a shiftable drive portion mounted on said driven shaft comprised of a sleeve member having second helical screw threads slidably engaging said first helical screw threads, a one-way clutch, and a drive pinion;
abutment means delimiting the maximum limit of axial travel of said shiftable drive portion relative to said driven shaft;
fixed mounting means;
friction connection means providing a friction connection between said shiftable drive portion and said fixed mounting means, said friction connection means including a resilient member normally applying a loading force to said friction connection to develop a retarding friction force normally urging said shiftable drive portion in an engaged direction; and
releasing means responsive to the reactive thrust developed on said shiftable drive portion when in contact with said abutment means to relieve said loading force and release said friction connection.
2. A starter drive as claimed in claim 1 wherein:
said one-way is a roller clutch having inner and outer race members and interconnecting rollers between said races, said one-way clutch having a spatial separation axially between inner and outer races permitting limited telescoping movement when said shiftable drive portion strikes said abutment means; and
said releasing means comprises a mechanical connection interconnecting said friction connection means and said one-way clutch releasing the resilient bias on said friction connection means on telescoping movement of said one-way clutch.
3. A starter drive as claimed in claim 1 wherein:
said friction connection is comprised of first and second mutually-abutting annular plate members, said first annular plate member being connected to said fixed mounting means to permit axial, but not rotative movement thereof, and said second annular plate member being slidably connected to said shiftable drive portion; and said resilient member is a spring connectively mounted relative to said sleeve member and abutting said second annular plate member to bias said plate members into frictional engagement.

4. A starter drive as claimed in claim 3 including:
spring means interposed between said fixed mounting means and said first annular plate member providing a biasing force resisting axial movement of said shiftable drive portion in a starter engaged direction.

5. A starter drive as claimed in claim 4 including:
ignition switch actuated braking means operative to provide a braking resistance on said drive shift on opening of an ignition switch; and said spring means are relatively weak springs providing a light force preventing drift of said shiftable drive portion due to vibration.

6. A starter drive as claimed in claim 4 wherein:
said spring means are relatively strong springs providing sufficient force to disengage and retract said shiftable drive portion on deceleration of said drive shaft.

References Cited

UNITED STATES PATENTS 3,299,719   1/1967   Toulier _____ 74—7

LAURENCE M. GOODRIDGE, Primary Examiner

U.S. Cl. X.R.

123—179